United States Patent [19]

Stankewitz

[11] Patent Number: 5,521,755
[45] Date of Patent: May 28, 1996

[54] EPI-ILLUMINATION SYSTEM FOR MICROSCOPES

[75] Inventor: Hans-Werner Stankewitz, Wetzlar, Germany

[73] Assignee: Leica Mikroskopie und Systeme GmbH, Wetzlar, Germany

[21] Appl. No.: 244,055

[22] PCT Filed: Sep. 15, 1993

[86] PCT No.: PCT/DE93/00865

§ 371 Date: Jun. 27, 1994

§ 102(e) Date: Jun. 27, 1994

[87] PCT Pub. No.: WO94/07168

PCT Pub. Date: Mar. 31, 1994

[30] Foreign Application Priority Data

Sep. 18, 1992 [DE] Germany .............. 42 31 267.1

[51] Int. Cl.⁶ .............. G02B 21/06; G02B 23/00
[52] U.S. Cl. .............. 359/385; 359/386; 359/388; 359/389; 359/399
[58] Field of Search .............. 359/385, 386, 359/388, 389, 390, 399

[56] References Cited

U.S. PATENT DOCUMENTS

| | | | |
|---|---|---|---|
| 3,277,782 | 10/1966 | Smith | 88/40 |
| 3,930,713 | 1/1976 | Stankewitz et al. | 359/387 |
| 4,232,937 | 11/1980 | Swaminathan et al. | 350/91 |
| 5,046,834 | 9/1991 | Dietrich | 359/381 |

FOREIGN PATENT DOCUMENTS

| | | | |
|---|---|---|---|
| 2021654 | 10/1971 | Germany . | |
| 2051174 | 4/1972 | Germany | 359/386 |
| 2232270 | 12/1990 | United Kingdom . | |

OTHER PUBLICATIONS

Patent Abstract of Japan vol. 8, No. 286 (P–324) (1723), Dec. 27, 1984.

*Primary Examiner*—Paul M. Dzierzynski
*Assistant Examiner*—Mohammad Y. Sikder
*Attorney, Agent, or Firm*—Bean, Kauffman & Spencer

[57] ABSTRACT

An epi-illumination system for microscopes is described, which contains an epi-illumination module (18) that consists of a Smith-splitter with an integrated telescope system (14). The telescope system (14) corrects in the sense of "Shift-Optics" differences in length that appear when switching from a modularly-designed 45 degree neutral splitter (20) to a Smith-splitter containing module (18). The arrangement of the two lenses in the telescope system (14) is such that the positive member (15) is directed towards the mirror (4) of the Smith-splitter and the negative member (16) is directed towards the light source (6). Alternatively it is also possible to install a telescope system with an opposite lens arrangement in a module (19), containing a 45-degree neutral splitter, if this is exchanged for a Smith-splitter containing module, so that the negative member (16) is directed towards the 45-degree neutral splitter (20) and the positive member (15) is directed towards the light source (6).

7 Claims, 2 Drawing Sheets

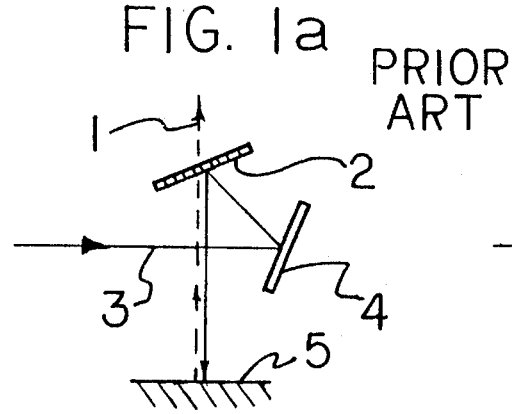
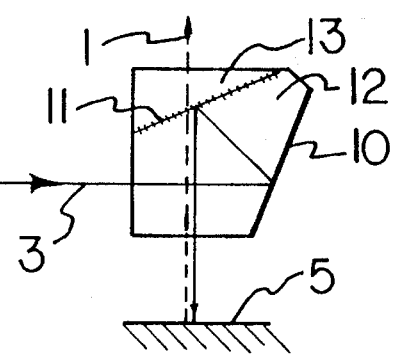
FIG. 1a PRIOR ART
FIG. 1b
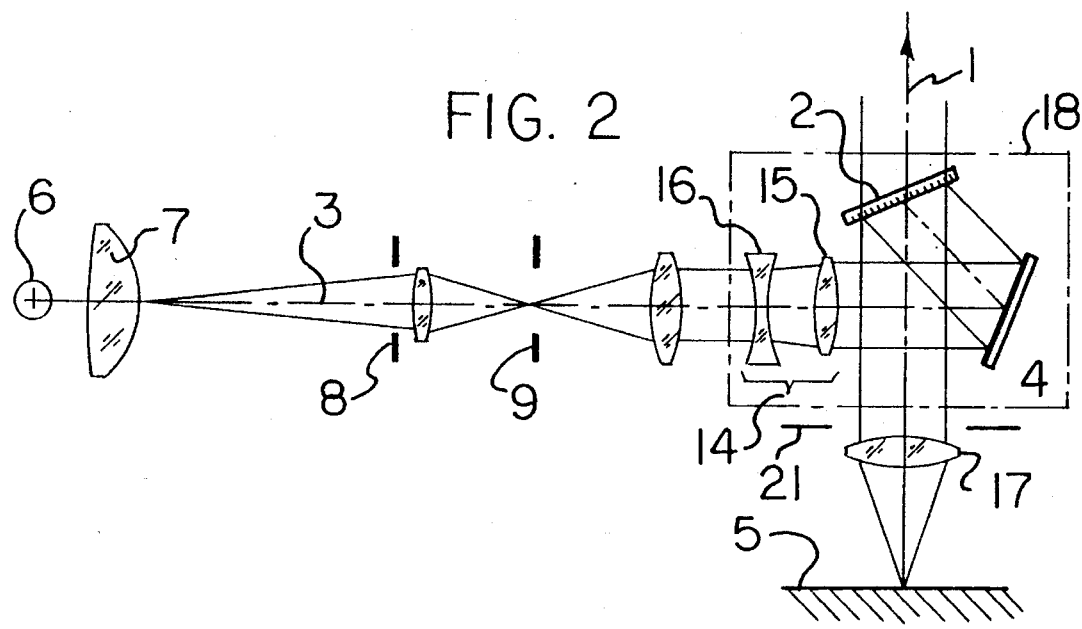
FIG. 2
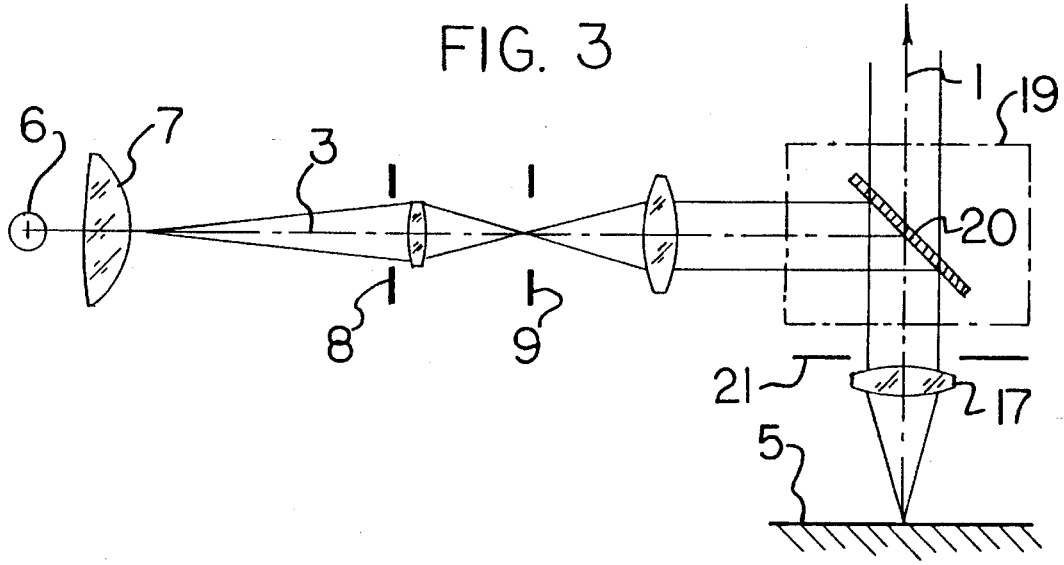
FIG. 3

EPI-ILLUMINATION SYSTEM FOR MICROSCOPES

BACKGROUND OF THE INVENTION

The invention pertains to an epi-illumination system for microscopes. From H. Riesenberg, Handbuch der Mikroskopie, 3rd ed., published by VEB Verlag Technik Berlin, p. 303 an epi-illumination polarizing equipment for microscopes is known in which a semi-transmissive planar glass is combined with a fully-reflecting mirror. This mirror combination is also called Smith-splitter. It is explained in further detail in FIG. 1a. A semi-transmissive planar surface (2) is positioned in such a way in a vertical optical axis (1) of the microscope, that it redirects an illumination beam (3), which hits horizontally onto a reflection mirror (4) and is from there reflected to the planar surface (2). The illumination beam (3) is redirected coaxially to the optical axis (1) in direction of the object (5). The light part that is reflected from the object (5) arrives after transmission through the semi-transmissive planar surface (2) in the direction of a microscope ocular (not depicted). The familiar Smith-splitter contains, moreover, a polarizing plate in between the light source (not-depicted) and the mirror (4). This plate is suitably positioned in such a way that the polarized light beam which impinges upon the semi-transmissive planar surface (2) is positioned with its polarized plane perpendicular or parallel to the plane of incidence. FIG. 1b has an internal reflection surface 10 in pentaprism 12 and semi-transmissive surface 11 between pentaprism 12 and right angle prism 13 as a known modified Smith-splitter.

It is desirable in the design of the multi-functional epi-illumination concept, that different splitter systems can be used side by side or in quick exchange, respectively, depending on the chosen epi-illumination mode, for instance, epi-illumination fluorescence, bright field, dark field, or polarization. If one switches, for instance, from a classic Smith-splitter arrangement to a conventional bright field epi-illumination arrangement with a 45-degree neutral splitter, considerable differences in the ray path lengths will result due to construction. Such a difference in length leads to erroneous image formation of the aperture stop in the pupil, which in turn results in undesirable losses of the image quality. It is thus the task of this invention to design an epi-illumination system for microscopes with which different epi-illumination variants can be chosen in quick sequence, whereby a correct image of the aperture stop in the exit pupil of the objective is achieved at the same time.

SUMMARY OF THE INVENTION

The task according to this invention is solved for an epi-illumination system that uses a plurality of modules and a telescope system to maintain the aperture stop image in the exit pupil of the microscope objective when the illumination path length changes.

BRIEF DESCRIPTION OF THE DRAWINGS

The nature and mode of operation of the present invention will now be more fully described in the following detailed description taken with the accompanying drawings wherein:

FIG. 1a: the familiar Smith-splitter;

FIG. 1b: a modified Smith arrangement;

FIG. 2: a microscopic epi-illumination ray path with an epi-illumination module according to this invention;

FIG. 3: an epi-illumination bright field ray path with a modularly designed 45-degree neutral splitter;

DETAILED DESCRIPTION

Figure 4:
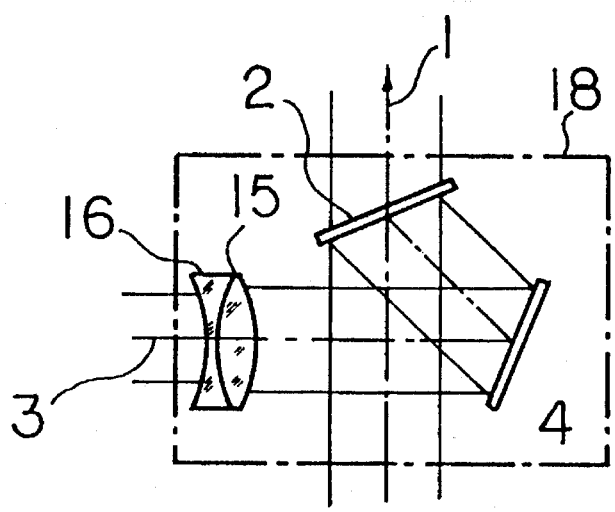
FIG. 4: a microscopic epi-illumination module according to this invention having a cemented telescope system.
Figure 5:
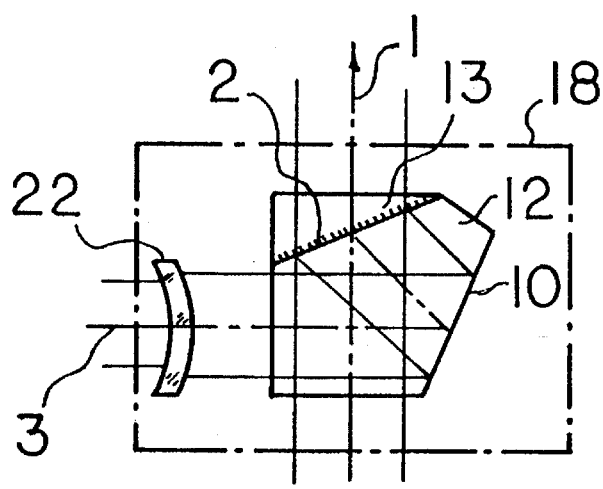
FIG. 5: a microscopic epi-illumination module according to this invention having a meniscus singlet telescope system.

The invention will be explained using FIGS. 2 and 3 in the following. Both figures differ basically only in the area of the modules 18 (FIG. 2) or 19 (FIG. 3) respectively. The illumination beam (3) comes from a light source (6), runs initially through a collector (7), then through the aperture stop (8), through a not closer characterized lens and proceeds through an illumination field diaphragm (9), thereafter it travels through another lens and arrives at a telescope system (14) arranged in an epi-illumination module (18). The telescope system (14) consists of a first negative member (16) and behind that a positive member (15). It is also possible that the telescope system consists of a cemented member (a combined positive and negative lens as shown in FIG. 4) or merely of a thick meniscus (22) with a positive and a negative surface as shown in FIG. 5. The horizontal illumination beam (3) arrives at the mirror (4) of the Smith-splitter, is totally reflected and directed toward the semi-transmissive planar surface (2) arranged at an angle ±45 degrees on the vertical optical axis (1) of the microscope. The part of the illumination beam that is reflected at the splitter surface (2) passes along the optical axis (1) and arrives, after leaving the epi-illumination module (18), at the objective (17) having an exit pupil (21) of the microscope and from there arrives at the object (5) to be illuminated and imaged. The image beam proceeds along the optical axis (1), again through the objective (17), thereafter enters the epi-illumination module (18) and passes through the semi-transmissive planar surface (2) and arrives from there at the ocular system (not shown) of the microscope.

If a multifunctionally-designed epi-illumination system for microscopes as arranged in the variant depicted in FIG. 3, that is, the bright field epi-illumination by means of a 45-degree neutral splitter (20), and is to be changed to an epi-illumination variant depicted in FIG. 2 by using a Smith-splitter, a difference in the length of the illumination ray path due to the design would result, as already explained above. Therefore the telescope system (3) is integrated into the epi-illumination module (18) resulting in a complete compensation or correction of the mentioned difference in length. The epi-illumination module (18 or 19 respectively) may be mounted exchangeably onto a module carrier (not shown). This module carrier may be designed as a linear slide or turret. This modular concept enables a quick switch between both beam splitter types.

Figure 6:
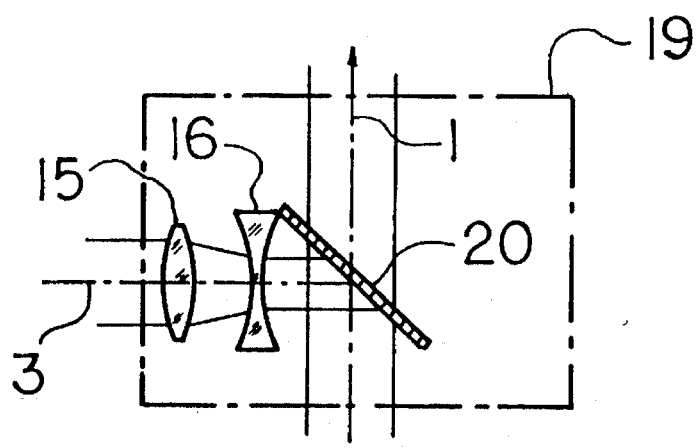
FIG. 6: a microscopic epi-illumination module according to this invention having the order of the negative and positive lenses of the telescope system reversed.

The described invention, however, is in principle also applicable for the opposite case design as explained in the following. If, for instance, an epi-illumination arrangement with a Smith-splitter (separate) without any additional optical parts mounted in the module, and the Smith-splitter is to be exchanged for a conventional 45-degree neutral splitter module, then according to the principle of this invention a telescope system should be arranged in the 45-degree neutral splitter as shown in FIG. 6 in such a way that its negative member is immediately directed toward the splitter surface and its positive member toward the light source. The telescope system in the last presented arrangement may be designed as an sub-module.

Through the integration of a telescope system into an epi-illumination system for microscopes according to this invention it is thus possible to interfere in a correcting manner depending on the chosen epi-illumination mode, so that the aperture stop is always correctly imaged in the pupil of the objective by the "shift optics". The modular construction enables a quick realization of all illumination variants in epi-illumination microscopy.

I claim:

1. An epi-illumination system for a microscope having a microscope axis for viewing an object through an objective having an exit pupil, a light source directing light along an epi-illumination axis intersecting said microscope axis for illuminating said object, and an aperture stop and field diaphragm positioned on said epi-illumination axis which comprises, a plurality of epi-illumination modules selectively positionable at the intersection of said axes, each of said plurality of modules having a beam splitter on said microscope axis and an illumination path length, the illumination path length of at least one of said plurality of modules being different than the illumination path length of another of said plurality of modules, said at least one of said plurality of modules having a telescope to adjust the respective illumination path to match said another illumination path length, wherein each of said modules produces an image of said aperture stop at said exit pupil.

2. An epi-illumination system according to claim 1, wherein said at least one of said plurality of modules includes a Smith-splitter having a mirror and said telescope system is positioned on said illumination axis between the field diaphragm and said mirror.

3. An epi-illumination system according to claim 1, wherein said telescope system consists of a positive front member and a negative back member.

4. An epi-illumination system according to claim 2, wherein said telescope system consists of a positive front member and a negative back member.

5. An epi-illumination system according to claim 1, wherein said at least one of said plurality of modules includes a Smith-splitter having a pentaprism and a right angle prism, and said beamsplitter is positioned between said prisms.

6. An epi-illumination system according to claim 1, wherein said telescope system consists of a positive lens cemented to a negative lens.

7. An epi-illumination system according to claim 1, wherein said telescope system consists of a one-piece meniscus having a positive surface and a negative surface.

* * * * *